(12) United States Patent
Yin

(10) Patent No.: US 8,064,933 B2
(45) Date of Patent: Nov. 22, 2011

(54) DIALING SYSTEM AND METHOD FOR A COMMUNICATION DEVICE

(75) Inventor: Zhi-Lu Yin, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 274 days.

(21) Appl. No.: 12/581,228

(22) Filed: Oct. 19, 2009

(65) Prior Publication Data

US 2010/0173617 A1    Jul. 8, 2010

(30) Foreign Application Priority Data

Jan. 5, 2009    (CN) .......................... 2009 1 0300057

(51) Int. Cl.
*H04W 68/00*    (2009.01)

(52) U.S. Cl. .......................................... 455/460; 379/41
(58) Field of Classification Search .................. 455/564, 455/401, 460
See application file for complete search history.

(56) References Cited

U.S. PATENT DOCUMENTS 7,715,790 B1 *    5/2010    Kennedy ...................... 455/41.2

* cited by examiner

*Primary Examiner* — Tu X Nguyen
(74) *Attorney, Agent, or Firm* — Altis Law Group, Inc.

(57) ABSTRACT

In a system and method for dialing for a communication device, all phone numbers of a contact in a contact list of the communication device are assigned priorities. All the phone numbers of the contact are ordered according to the priorities. A phone number of the contact are associated with a next phone number according to the order. If a user dials a phone number but the phone number cannot be dialed through, the other phone numbers associated with the phone number are dialed according to the priorities. If all the phone numbers have not been dialed through, the communication device sends a message to a mobile phone number of the contact for informing the user cannot communicate with the contact.

9 Claims, 3 Drawing Sheets

DIALING SYSTEM AND METHOD FOR A COMMUNICATION DEVICE

BACKGROUND

1. Technical Field

Embodiments of the present disclosure relate to dialing systems and methods, and more particularly to a dialing system and method for a communication device.

2. Description of Related Art

At present, a contact in a contact list of a mobile electronic device may have more than one contact phone numbers. These more than one contact phone numbers may include an office phone number, a home phone number, and/or mobile phone number, for example. If the contact cannot be dialed through using a dialed phone number, then a user often has to search other contact phone numbers of the contact. This process is inconvenient and time-consuming.

Therefore, an effective system and method is needed to overcome the described limitations.

DETAILED DESCRIPTION

All of the processes described below may be embodied in, and fully automated via, functional modules executed by one or more general purpose processors. The functional modules may be stored in any type of computer-readable medium or other computer storage device. Some or all of the methods may alternatively be embodied in specialized computer hardware or communication apparatus.

Figure 1:
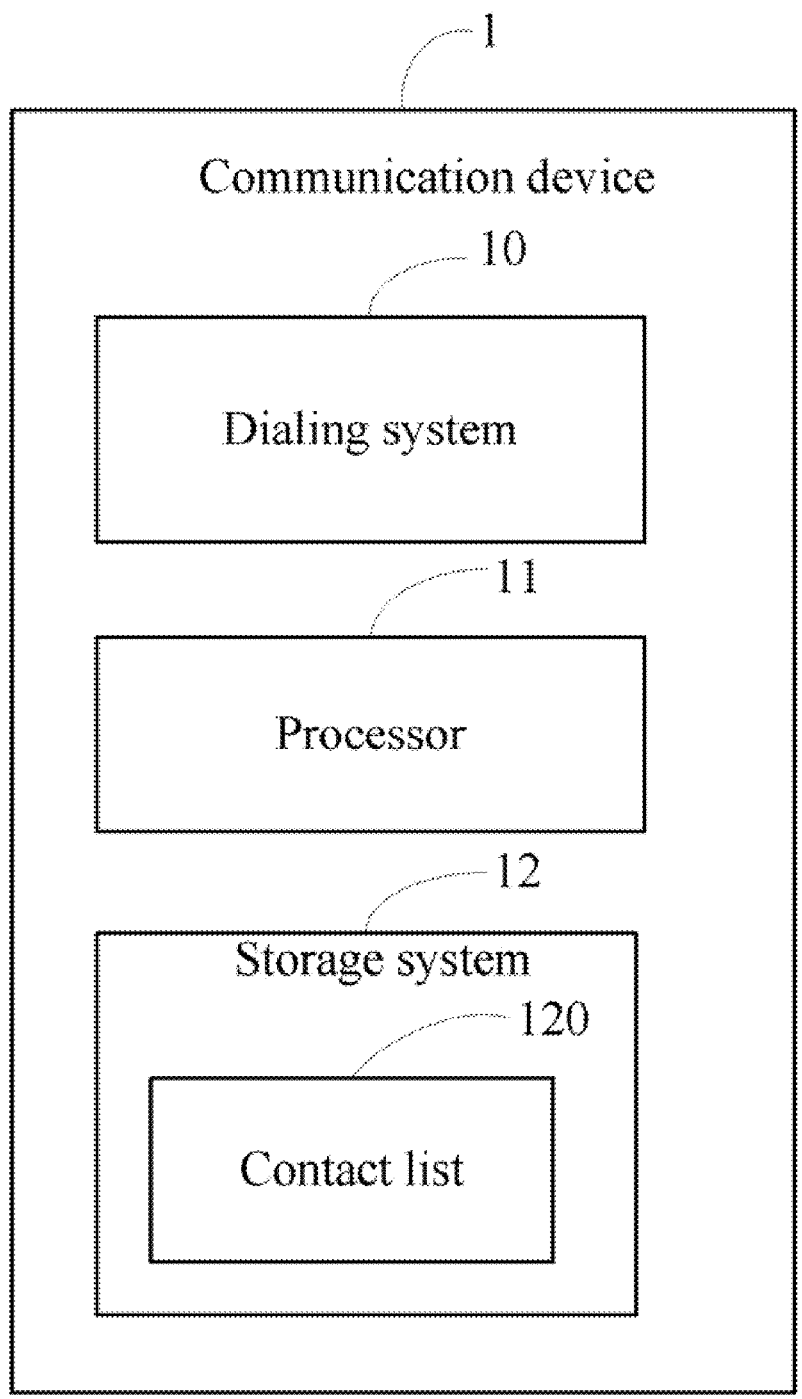
FIG. 1 is a block diagram of one embodiment of a communication device including a dialing system.

FIG. 1 is a block diagram of one embodiment of a communication device 1 including a dialing system 10. The dialing system 10 may be used to dial phone numbers of contact in a contact list 120 of the communication device 1. In one embodiment, the communication device 1 may be a mobile phone, a personal digital assistant (PDA). The communication device 1 includes a processor 11 and a storage system 12. The processor 11 executes one or more computerized operations of the communication device 1 and other applications, to provide the functions of the communication device 1. The storage system 12 stores one or more programs, such as programs of an operating system, other applications of the electronic device 1, and various kinds of data, such as the personalized function settings and the original settings of the function settings of the electronic device 1, messages, or E-mails, for example. The contact list 120 is stored in the storage system 12. The contact list 120 lists various contact information, such as a name, and one or more kind of phone numbers, an E-mail address, for example. In one embodiment, the type of phone numbers may be a mobile phone number, an office phone number, and a home phone number.

Figure 2:
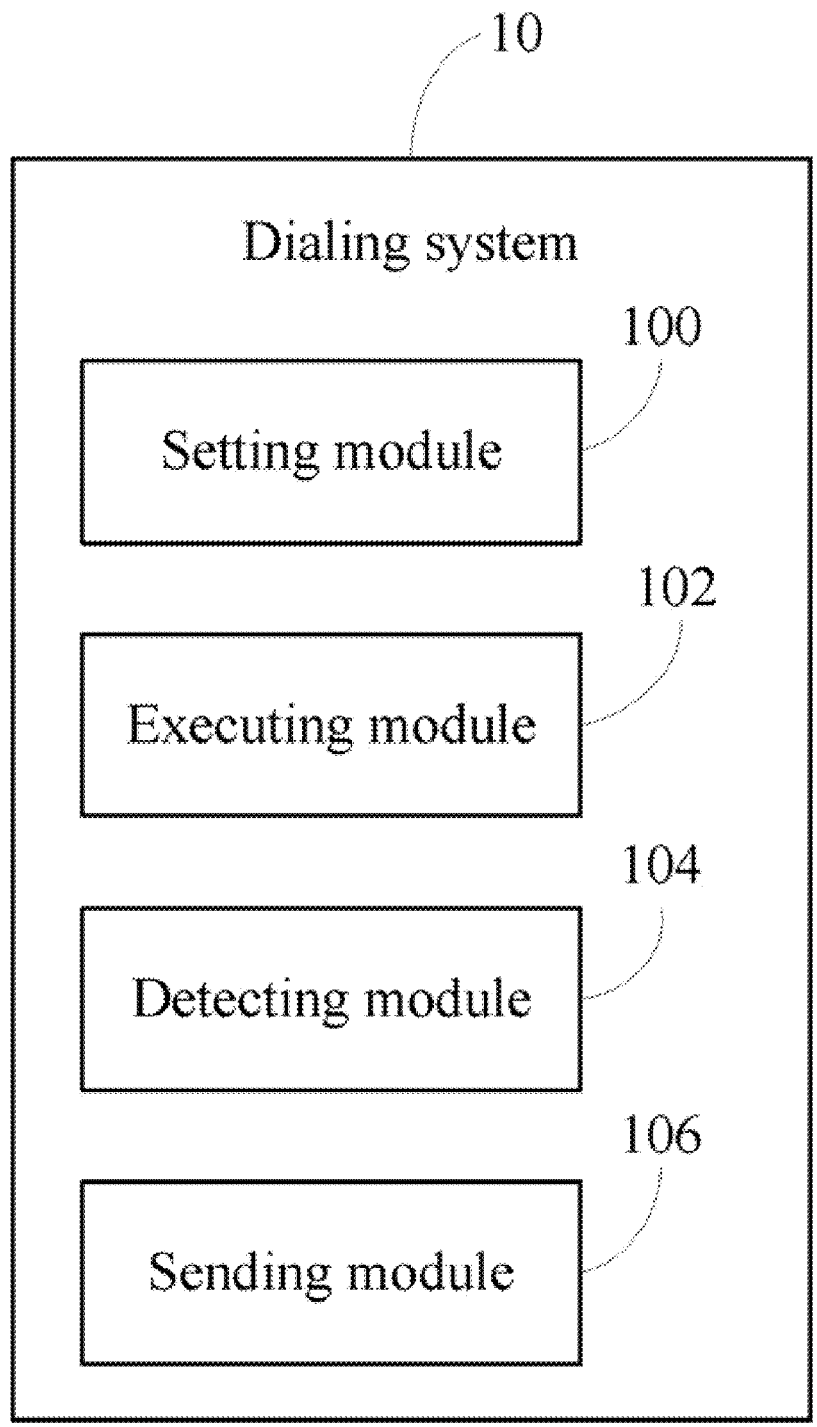
FIG. 2 is a block diagram of one embodiment of the dialing system in FIG. 1.

FIG. 2 is a block diagram of one embodiment of the dialing system 10 in FIG. 1. In one embodiment, the dialing system 10 may include a setting module 100, an executing module 102, a detecting module 104, and a sending module 106. It may be understood that one or more specialized or general purpose processors, such as the processor 11, may be used to execute one or more computerized codes of the functional modules 100, 102, 104, and 106. The one or more computerized codes of the functional modules 100, 102, 104, and 106 may be stored in the storage system 12.

The setting module 100 assigns priorities to all the phone number of a contact in the contact list 120 according to user requirements. The setting module 100 also establishes an order of all the phone numbers of the contact according to the priorities, and associates a phone number to a next phone number of the contact according to the order. For example, the phone numbers of a contact include a mobile phone number, an office phone number, and a home phone number. In one example, the setting module 100 may assign a higher priority to the mobile phone number than to the home phone number, and may assign a higher priory to the home phone number than to the office phone number. The order of all the phone numbers of the contact is: the mobile phone number, the home phone number, and the office phone number. Then the setting module 100 associates the mobile phone number, the home phone number, and the office phone number according to the order. In one embodiment, the phone numbers of the contact may be dialed from the higher priority to the lower priority. For example, if a phone number of the contact cannot be dialed through, the next phone number whose priority is lower than the phone number is to be dialed.

If a user selects a phone number of the contact, the executing module 102 dials the selected phone number of the contact.

The detecting module 104 detects if the selected phone number can be dialed through. If the selected phone number cannot be dialed through, the executing module 102 dials each of the other phone numbers associated with the selected phone number according to the set priorities one by one until a connection with one of the other phone numbers has been established. In one embodiment, if the phone number is answered by a person, the phone number is defined as being dialed through. The phone numbers of the contact are dialed from the higher priority to the lower priority one by one. Depending one the embodiment, if the user dials the mobile phone number of the contact, and the mobile phone number cannot be dialed through, the executing module 102 may dial the home phone number. If the home phone number also cannot be dialed through, then the executing module 102 may dial the office phone number.

If the selected phone number has been dialed through, the detecting module 14 also detects if the communication device 1 receives overtime information from a corresponding telecom operator. If the communication device 1 receives overtime information, the executing module 102 dials the other phone numbers associated with the selected phone number. In one embodiment, if the selected phone number has been dialed through but the phone number has not been answered for one minute, the telecom operator may inform that "There is nobody answering the phone number you dialed".

The detecting module 104 further detects if all the phone numbers of the contact have been dialed and all the phone numbers cannot be dialed through. If all the phone numbers of the contact have been dialed and cannot be dialed through, the detecting module 104 detects if there is a mobile phone number of the contact in the contact list 120.

If there is a mobile phone number of the contact in the contact list 120, the sending module 106 sends a message to the mobile phone number for informing the contact that the user cannot communicate with the contact.

Figure 3:
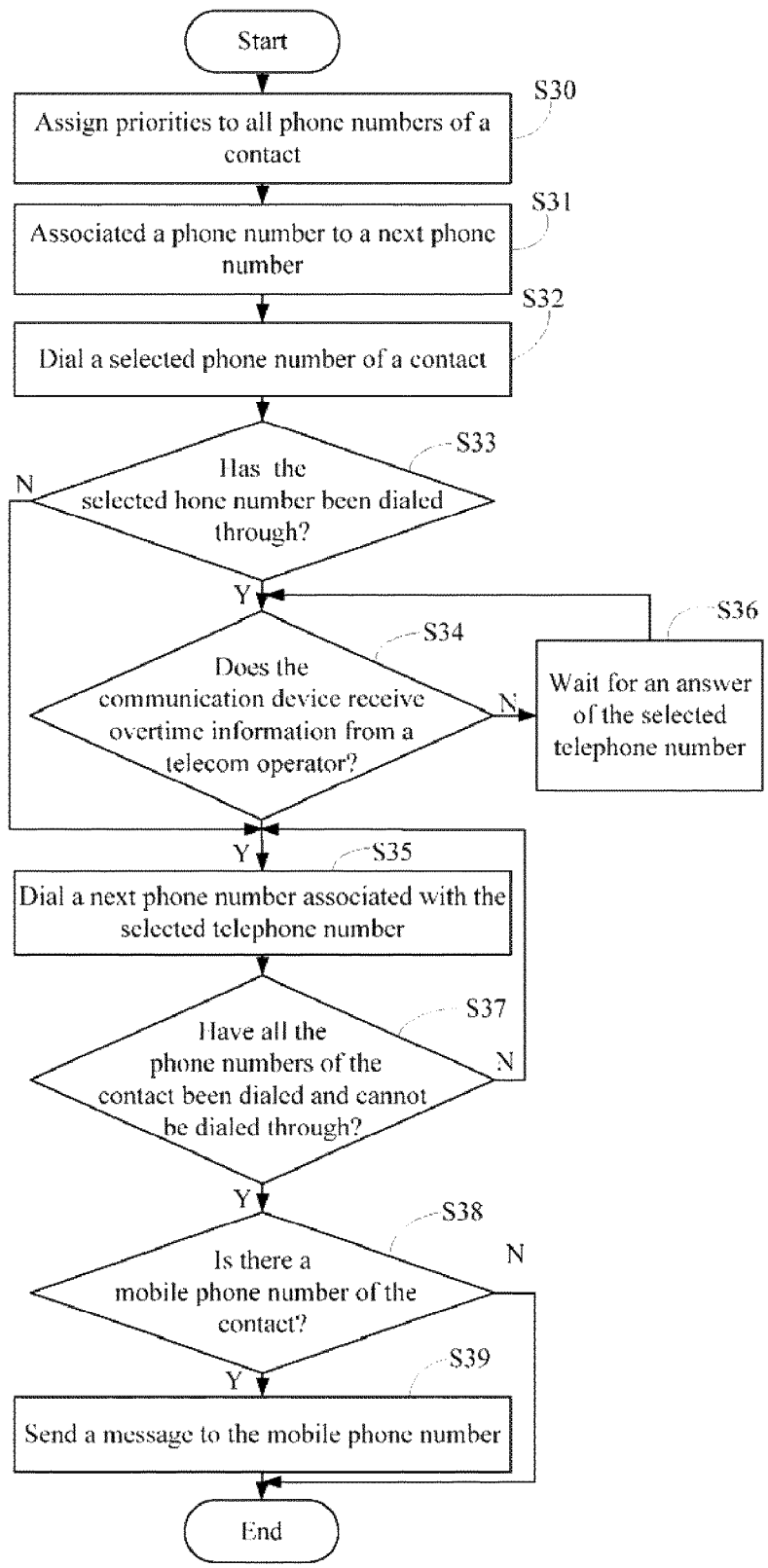
FIG. 3 is a flowchart of one embodiment of a method for dialing for a communication device.

FIG. 3 is a flowchart of one embodiment of a method for dialing for a communication device, employed in a system such as, for example, that of FIG. 1. Depending on the embodiment, additional blocks may be added, others removed, and the ordering of the blocks may be changed.

In block S30, the setting module 100 assigns priorities to all phone numbers of a contact in the contact list 120 according to user requirements. In block S31, the setting module 100 establishes an order of all the phone numbers of the contact according to the priorities, and associates a phone number to a next phone number according to the order.

In block S32, if a user selects a phone number from the phone numbers of a contact, the executing module 102 dials the selected phone number.

In block S33, the detecting module 104 detects if the selected phone number has been dialed through. If the selected phone number has been dialed through, block S34 is implemented. If the selected phone number cannot be dialed through, block S35 is implemented.

In block S34, the detecting module 104 detects if the communication device 1 receives overtime information from a corresponding telecom operator. If the communication device 1 receives the overtime information, in block S35, the executing module 102 dials the next phone number associated with the selected phone number, and block S37 is implemented. If the communication device 1 does not receive the overtime information, in block S36, the user waits for an answer of the selected phone number, and the procedure returns to block S34.

In block S37, the detecting module 104 detects if all the phone numbers of the contact have been dialed and cannot be dialed through. If all the phone numbers of the contact have been dialed and cannot be dialed through, block S38 is implemented. If there are some phone numbers having not been dialed, block S35 is repeated.

In block S38, the detecting module 104 detects a mobile phone number of the contact in the contact list 120. If there is a mobile phone number of the contact in the contact list 120, in block S39, the sending module 106 sends a message to the mobile phone number for informing the contact that the user cannot communicate with the contact. If there is no mobile phone number of the contact in the contact list 120, the procedure ends.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A dialing system for a communication device, the dialing system comprising:
    a storage system; and
    at least one processor to execute one or more programs stored in the storage system, the one or more programs comprising:
    a setting module operable to assign priorities to all phone numbers of a contact in a contact list of the communication device, establish an order of all the phone numbers according to the priorities, and associate a phone number to a next phone number according to the order;
    an executing module operable to dial a selected phone number of the contact, and dial each of the other phone numbers associated with the selected phone number if the selected phone number cannot be dialed through;
    a detecting module operable to detect a mobile phone number of the contact if all the phone numbers of the contact have been dialed and cannot be dialed through; and
    a sending module operable to send a message to the mobile phone number for informing the contact that the contact cannot be communicated.

2. The dialing system of claim 1, wherein the executing module is further operable to dial each of the phone numbers of the contact according to the priority of each of the phone numbers.

3. The dialing system of claim 1, wherein the detecting module is further operable to detect if the selected phone number has been dialed through, and detect if the communication device receives overtime information from a corresponding telecom operator if the selected phone number has been dialed through.

4. A dialing method for a communication device, the method comprising:
    (a) assign priorities to all phone numbers of a contact in a contact list of the communication device;
    (b) establishing an order of all the phone numbers according to the priorities, and associating a phone number to a next phone number according to the order;
    (c) dialing a selected phone number of a contact;
    (d) dialing each of the other phone numbers associated with the selected phone number one by one until a connection with one of the other phone numbers has been established if the selected phone number cannot be dialed through;
    (e) detecting if there is a mobile phone number of the contact in the contact list if all the phone numbers of the contact have been dialed and cannot be dialed through; and
    (f) sending a message to the mobile phone number for informing the contact that the contact cannot be communicated.

5. The method of claim 4, wherein in block (d) dialing each of the other phone numbers of the contact is according to the priorities of each of the phone numbers.

6. The method of claim 4, before block (d) further comprising:
    detecting if the selected phone number has been dialed through;
    detecting if the communication device receives overtime information from a corresponding telecom operator if the selected phone number has been dialed through; and
    waiting for an answer of the selected phone number if the selected phone number does not receive overtime information, or going to the block (c) if the selected phone number receives overtime information.

7. A medium having stored therein instructions that, when executed by a communication device, cause the communication device to perform a dialing method for the communication device, the method comprising:
    (a) assign priorities to all phone numbers of a contact in a contact list of the communication device;
    (b) establishing an order of all the phone numbers according to the priorities, and associating a phone number to a next phone number according to the order;
    (c) dialing a selected phone number of a contact;
    (d) dialing each of the other phone numbers associated with the selected phone number one by one until a connection with one of the other phone numbers has been established if the selected phone number cannot be dialed through;
    (e) detecting if there is a mobile phone number of the contact in the contact list if all the phone numbers of the contact have been dialed and cannot be dialed through; and (f) sending a message to the mobile phone number for informing the contact that the contact cannot be communicated.

8. The medium of claim 7, wherein in block (d) dialing each of the other phone numbers of the contact is according to the priorities of each of the phone numbers.

9. The medium of claim 7, before block (d) further comprising:

detecting if the selected phone number has been dialed through;

detecting if the communication device receives overtime information from a corresponding telecom operator if the selected phone number has been dialed through; and waiting for an answer of the selected phone number if the selected phone number does not receive overtime information, or going to the block (c) if the selected phone number receives overtime information.

* * * * *